(No Model.)
A. W. PARMELEE.
SCREW HOOK AND EYE.
No. 350,209. Patented Oct. 5, 1886.
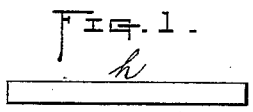
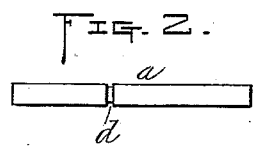
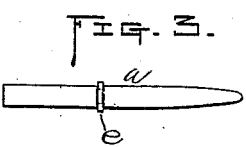
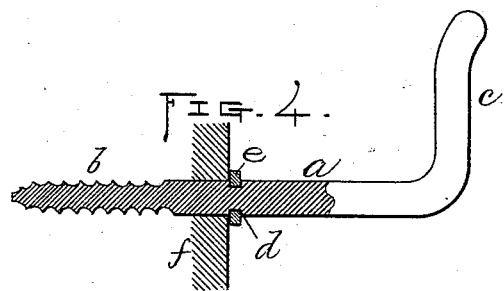
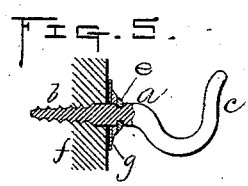
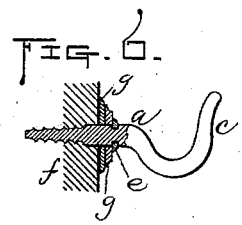
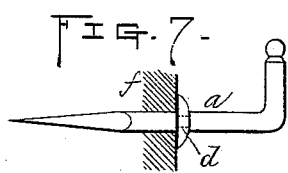
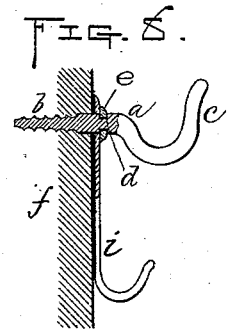
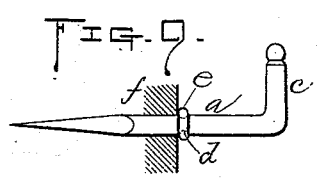
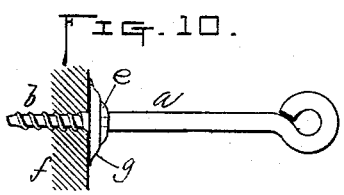
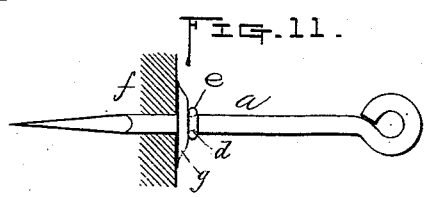
Witnesses;
Walter B. Nourse,
Lucius W. Briggs.
Inventor;
Arthur W. Parmelee,
By A. A. Barker Att'y.

UNITED STATES PATENT OFFICE.

ARTHUR W. PARMELEE, OF WORCESTER, MASSACHUSETTS.

SCREW HOOK AND EYE.

SPECIFICATION forming part of Letters Patent No. 350,209, dated October 5, 1886.

Application filed July 6, 1886. Serial No. 207,259. (No model.)

*To all whom it may concern:*

Be it known that I, ARTHUR W. PARMELEE, of Worcester, in the county of Worcester and State of Massachusetts, have invented certain new and useful Improvements in Screw or Drive Hooks and Eyes; and I do hereby declare that the following is a full, clear, and exact description of the same, reference being had to the accompanying drawings, forming a part of this specification, and in which—

Figure 1 represents a plain piece of wire suitable for making one of my aforesaid screw or drive hooks from. Figs. 2 and 3 represent said screw or drive hook in different stages of construction. Fig. 4 represents upon an enlarged scale a completed screw-hook embodying the more essential part of my improvements. Figs. 5 to 9, inclusive, represent different modifications of my invention applied to the manufacture of screw and drive hooks; and Figs. 10 and 11 represent my invention applied to the manufacture of screw-eyes.

My invention relates more particularly to improvements in screw or drive hooks, but is equally applicable to screw or drive eyes; and I therefore desire to cover the application thereof to either in manufacturing the same.

Said invention consists in forming a circular groove or depression in the periphery of the wire at the proper distance from its screw or drive end, and fastening therein, preferably so that it may turn, a ring or washer, which may serve as a gage or stop in fastening the screw or drive hooks and eyes in position, and also to ornament the same.

It also consists in interposing one or more suitable washers or rings between said recessed ring or washer and the part to which said screw or drive hooks and eyes may be fastened, all as hereinafter set forth.

To enable others skilled in the art to which my invention appertains to make and use the same, I will now proceed to describe it more in detail.

For the purpose of convenience, I will first describe my invention as being applied to a screw-hook, and later to a drive-hook and screw or drive eye.

Referring to Fig. 6, the part marked $a$ represents the shank or body of said screw-hook, upon one end of which is formed the threaded part $b$, while its opposite end is made of the proper shape to form the desired hook $c$. Various shapes may be adopted, and I therefore limit myself to no especial style or design. Upon the body of the hook, at a short distance from the threaded part or screw $b$, is formed a groove or recess, $d$, (see Fig. 2,) in which is fitted a ring or washer, $e$. Said groove may be formed partially or entirely around the body of the hook, and the same, as well as the ring or washer, may be of any desired size, shape, or design to suit different requirements—as, for instance, the groove may be made square in form and the ring correspondingly shaped in cross section, as indicated in Figs. 2, 3, and 4; or said groove may be made in the form of a half-circle, and a round ring of wire used in connection therewith, as shown in Figs. 9 and 11 of the drawings. The purpose of the ring or washer $e$ is, as is well known, to form a gage or stop to govern the distance that the hook is inserted in the part to which the same is fastened, and also to form a base for said hook, and thus serve both a useful and ornamental purpose. If desired, one or more washers or base-pieces, $g$, made either solid or hollow in cross-section, may be interposed between the ring or washer $e$, fitted in the groove or recess $d$, and the part $f$, to which the hook is fastened. By thus interposing one or more washers, as aforesaid, of a neat and tasty design, it is obvious that a very pleasing and ornamental effect is imparted to the hook when secured in position, especially so when employing washers of different materials or finish showing a contrast one against the other.

The groove $d$ may be made by cutting away the metal or by compression, as preferred; or the whole hook may be cast with the groove and thread formed at one operation, and the ring or washer subsequently fitted and fastened in position. In practice, however, I prefer to make the hook of a single piece of wire, $h$, such as shown in Fig. 1, then cut or compress the groove therein, as shown in Fig. 2. I then form the hook $c$ upon one end, either straight or tapering and of the desired shape, and the screw $b$ upon its opposite end by cutting a thread in the usual way thereon, after which a split ring or washer of the desired size, shape, and design is fitted over the groove or recess and compressed therein, so as to bring the two ends together and form a continuous band around said groove, thus completing the hook ready to be applied, either with or without the interposing washers $g$, as desired, and shown in the drawings. I prefer in practice to fasten the ring or washer $e$ a little loose in the groove $d$, so that the hook may turn independent thereof in fastening it in position, and thus prevent injury to the wood-work under said ring or washer.

In Figs. 7 and 9 I have shown my invention as being applied to a drive-hook with the grooves or recesses and rings or washers of different shapes, while in Figs. 10 and 11 the same is shown as being applied to both a screw and a drive eye, respectively, both of which, as will at once be seen, come within the scope of said invention, and I therefore reserve the right to thus apply the same. I also reserve the right to employ a supplementary hook, $i$, (see Fig. 8,) interposed between the ring or washer $e$, and part to which the main hook is fastened and suspended from said main hook.

I am aware it is not new to form screw or drive hooks and eyes in one part, and also to form stop-rings or bases thereon for the purpose specified; and I therefore limit my invention to the method of making said screw or drive hooks and eyes as hereinbefore described, and shown in the drawings.

Having described my said invention, what I claim therein as new, and desire to secure by Letters Patent, is—

1. In the art of making screw or drive hooks and eyes having a stop-ring or base thereon, the method of forming the screw or drive end and hook or eye in one part, and the stop-ring or base by forming a groove or recess around the body of the hook or eye and fitting and fastening therein a suitable ring or washer, substantially as shown and described.

2. In a screw or drive hook or eye, the combination of the screw or drive end and hook or eye made in one part, with a stop-ring or base made by forming a groove or recess around the body of said hook or eye and fitting and fastening therein a suitable ring or washer, substantially as shown and described.

3. In a screw or drive hook or eye, the combination of the screw or drive end and hook or eye made in one part, with a stop-ring or base made by forming a groove or recess around the body of said hook or eye and fitting and fastening therein a suitable ring or washer, and one or more washers or base-pieces interposed between said stop-ring or base and the part to which the hook or eye is attached, substantially as shown and described.

4. The combination of a screw or drive hook or eye made in one part, and having a stop-ring or base made by forming a groove or recess around the body of said hook or eye and fitting and fastening therein a suitable ring or washer, with one or more washers or base-pieces interposed between said stop-ring or base and the part to which the hook or eye is attached, substantially as shown and described.

ARTHUR W. PARMELEE.

Witnesses:
  ALBERT A. BARKER,
  WALTER B. NOURSEE.